(12) United States Patent
McMillan et al.

(10) Patent No.: US 6,913,436 B2
(45) Date of Patent: Jul. 5, 2005

(54) GAS TURBINE ENGINE BLADE CONTAINMENT ASSEMBLY

(75) Inventors: Alison J McMillan, Uttoxeter (GB); Ian C D Care, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/732,344

(22) Filed: Dec. 11, 2003

(65) Prior Publication Data

US 2004/0141837 A1 Jul. 22, 2004

(30) Foreign Application Priority Data

Jan. 16, 2003 (GB) ............................................ 0300999

(51) Int. Cl.$^7$ .............................................. F01D 21/00
(52) U.S. Cl. ...................................... 415/9; 415/173.4
(58) Field of Search ................................ 415/200, 220, 415/219.1, 173.4, 174.4, 9; 60/223, 30.091

(56) References Cited

U.S. PATENT DOCUMENTS

| 4,149,824 A | 4/1979 | Adamson |
| 6,053,696 A | 4/2000 | Roberts |
| 6,652,222 B1 | 11/2003 | Wojtyczka et al. |
| 6,814,541 B2 * | 11/2004 | Evans et al. ................ 415/200 |

FOREIGN PATENT DOCUMENTS

| EP | 927815 A | 7/1999 |
| EP | 952310 A | 10/1999 |
| SU | 0 906 211 | 4/1995 |

* cited by examiner

Primary Examiner—Ninh H. Nguyen
(74) Attorney, Agent, or Firm—W. Warren Taltavull; Manelli Denison & Selter PLLC

(57) ABSTRACT

A gas turbine engine rotor blade containment assembly comprises a generally cylindrical, or frustoconical, stiff containment casing (54), a generally cylindrical, or frustoconical, flexible structure (62) arranged within and spaced radially from the stiff containment casing (54) by crushable structures (64, 66) at axially spaced positions on the flexible structure (62). A viscoelastic material (68) is arranged to fill the space (70) between the stiff containment casing (54), the flexible structure (62) and the crushable structures (64, 66). The viscoelastic material (68) provides local stiffening of the blade containment assembly in the region of a fan blade (34) impact and provides energy dissipation by viscoelastic damping of the flexing of the flexible structure (62) and plastic deformation in the crushing of the crushable structures (64, 66).

21 Claims, 2 Drawing Sheets

US 6,913,436 B2

GAS TURBINE ENGINE BLADE CONTAINMENT ASSEMBLY

The present invention relates to gas turbine engine casings, particularly gas turbine engine fan casings, more particularly to an improved blade containment assembly for use within or forming part of the gas turbine engine casing.

Turbofan gas turbine engines for powering aircraft conventionally comprise a core engine, which drives a fan. The fan comprises a number of radially extending fan blades mounted on a fan rotor, which is enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility that with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide circumferentially and radially extending ribs on metallic containment rings. It is also known generally cylindrical, or frustoconical, locally thickened, isogrid, metallic containment rings. Furthermore it is known to provide strong fibrous material wound around relatively thin metallic casings or around the above-mentioned containment casings. In the event that a blade becomes detached it passes through the casing and is contained by the fibrous material.

Our published European patent application EP1245791A2 discloses the use of an upstream containment portion comprising circumferentially and radially extending ribs on a metallic containment ring and a downstream portion comprising a stiff and lightweight honeycomb material on the inner surface of a containment ring. The upstream portion is arranged in the plane of the fan blades to arrest the fan blade tip through plastic deformation and the downstream portion is arranged to arrest the fan blade root through crushing of the honeycomb material.

However, this containment assembly is too heavy, when used for large diameter turbofan gas turbine engines even if the upstream portion of the containment ring comprises steel and the downstream portion of the containment ring comprises titanium.

Accordingly the present invention seeks to provide a novel gas turbine engine rotor blade containment assembly, which reduces, preferably overcomes, the above-mentioned problems.

Accordingly the present invention provides a gas turbine engine rotor blade containment assembly comprises a generally cylindrical, or frustoconical, stiff containment casing, a generally cylindrical, or frustoconical, flexible structure arranged within and spaced radially from the stiff containment casing by crushable structures at axially spaced positions on the flexible structure, a viscoelastic material arranged to at least partially fill the space between the stiff containment casing, the flexible structure and the crushable structures.

Preferably the viscoelastic material is arranged to fill the space between the stiff containment casing, the flexible structure and the crushable structures.

Preferably the stiff containment casing comprises circumferentially extending ribs extending radially outwardly from the casing to stiffen the casing.

Alternatively the stiff containment casing comprises a cellular structure to stiffen the casing.

Preferably the crushable structure comprises a cellular structure or metal foam. The crushable structure may contain a viscoelastic material in the pores of the cellular structure or metal foam. Preferably the pores of the cellular structure or metal foam are interconnected with the space between the stiff containment casing, the flexible structure and the crushable structures.

Preferably the flexible structure comprises a cellular structure or metal foam. The cellular structure may comprise honeycomb.

Preferably squeeze film lands are arranged in the space between the stiff casing and the flexible structure. Preferably the squeeze film lands are arranged axially adjacent to the crushable structures. Preferably the squeeze film lands are arranged adjacent to the stiff containment casing and spaced radially from the flexible structure. Preferably the squeeze film lands comprise a crushable material. Preferably the crushable material comprises a cellular structure or metal foam.

Preferably the crushable material comprises a viscoelastic material in the pores of the cellular structure or metal foam. Preferably the pores of the cellular structure or metal foam are interconnected with the space between the stiff containment casing, the flexible structure and the crushable structures.

The viscoelastic material may comprise particles.

Preferably an abradable layer is arranged on the radially inner surface of the flexible structure.

Preferably the stiff containment casing comprises a steel alloy, aluminium, an aluminium alloy, magnesium, a magnesium alloy, titanium, a titanium alloy, nickel or a nickel alloy.

The viscoelastic material may comprise grease, a thixotropic paste, a polymer resin or a granular material.

The stiff containment casing may be a fan containment casing, a compressor containment casing or a turbine containment casing.

The present invention will be more fully described by way of example with reference to the accompanying drawings in which.

Figure 1:
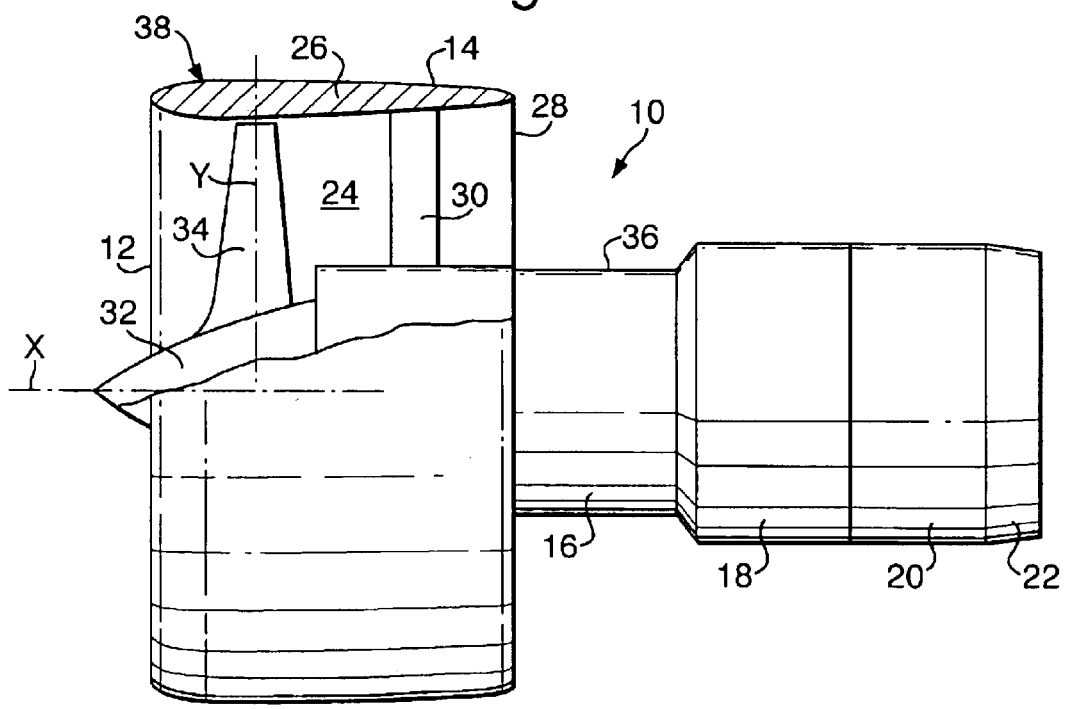
FIG. 1 shows a turbofan gas turbine engine having a rotor blade containment assembly according to the present invention.

A turbofan gas turbine engine 10, as shown in FIG. 1, comprises in axial flow series an intake 12, a fan section 14, a compressor section 16, a combustion section 18, a turbine section 20 and an exhaust 22. The turbine section 20 comprises one or more turbines arranged to drive one or more compressors in the compressor section 16 via shafts (not shown). The turbine section 20 also comprises a turbine to drive the fan section 14 via a shaft (not shown). The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing 26 surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane Y of the fan blades 34.

Figure 3:
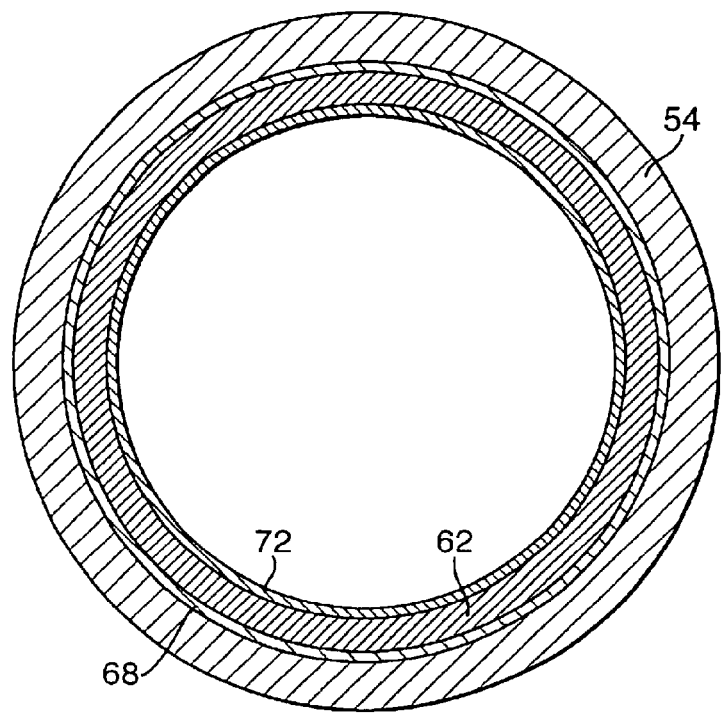
FIG. 3 is a reduced cross-sectional view in the direction of arrows A in FIG. 2.
Figure 2:
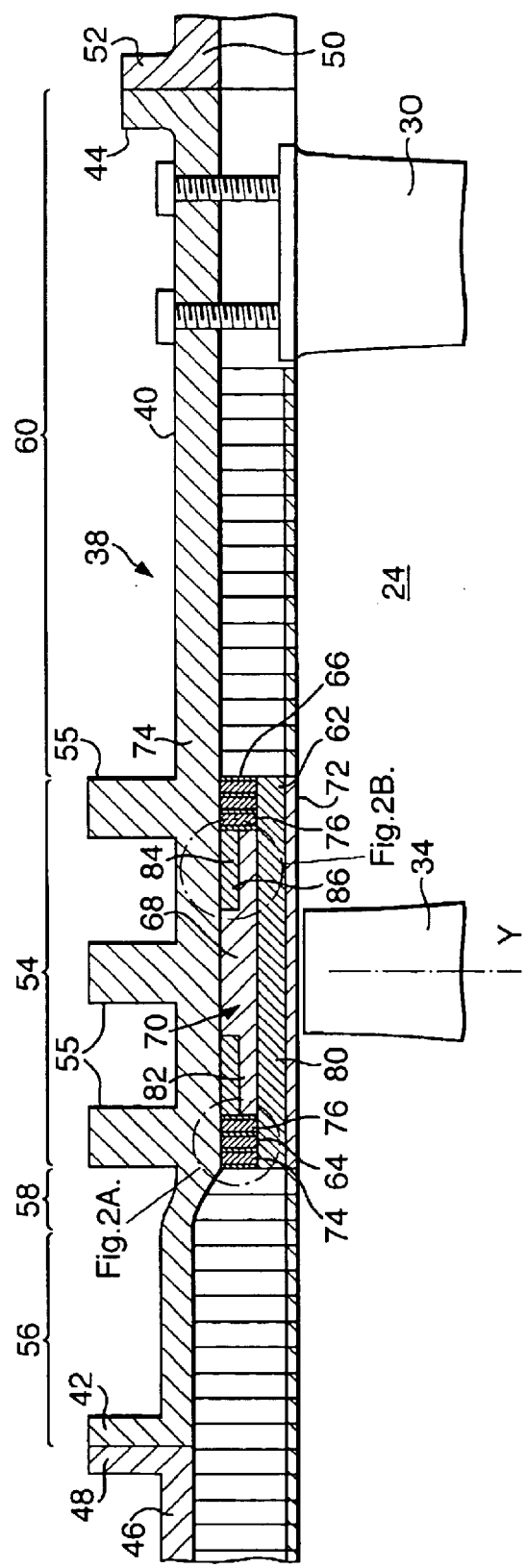
FIG. 2 is an enlarged cross-sectional view of the rotor blade containment assembly shown in FIG. 1.

The fan casing 26 and fan blade containment assembly 38 is shown more clearly in FIGS. 2 and 3. The fan blade containment assembly 38 comprises a generally cylindrical, or frustoconical, metal casing 40. The metal casing 40 comprises an upstream flange 42 by which the fan blade containment assembly 38 is connected to a flange 48 on an intake assembly 46 of the fan casing 26. The metal casing 40 also comprises a downstream flange 44 by which the fan blade containment assembly 38 is connected to a flange 52 on a rear portion 50 of the fan casing 26.

The metal casing 40 provides the basic fan blade containment and provides a connection between the intake casing 46 and the rear casing 50.

The metal casing 40 comprises an upstream portion 56, a transition portion 58, a main blade containment portion 54 and a downstream portion 60. The upstream portion 56 comprises the flange 42 and the downstream portion 60 comprises the flange 44.

The upstream portion 56 is upstream of the plane Y of the fan blades 34 and provides debris protection for the fan blade containment assembly 38. The main blade containment portion 54 is substantially in the plane Y containing the fan blades 34 and comprises one or more integral ribs 55, which extend radially outwardly from the main blade containment portion 54. The ribs 55 may be T-shaped in cross-section or other suitable shapes. The ribs 55 extend circumferentially around the main blade containment portion 54 to stiffen the main blade containment portion 54 to improve the fan blade containment properties. The transition portion 58 connects the main blade containment portion 54 and the upstream containment portion 56 to transmit loads from the main blade containment portion 54 to the upstream flange 42 on the upstream portion 56. The downstream portion 60 is provided downstream of the plane Y of the fan blades 34, and provides protection for where a root of a fan blade 34 impacts the fan blade containment assembly 38.

The main blade containment portion 54 comprises a generally cylindrical, or frustoconical, stiff containment casing. A generally cylindrical, or frustoconical, flexible structure 62 is arranged within and spaced radially from the stiff containment casing 54 by crushable structures 64 and 66 at axially spaced positions, in particular the axial ends, on the flexible structure 62. A viscoelastic material 68 is arranged to fill the space 70 between the stiff containment casing 54, the flexible structure 62 and the crushable structures 64 and 66. An abradable layer 72 is arranged on the radially inner surface of the flexible structure 62. The abradable layer 72 provides a close clearance with the tips of the fan blades 34 in normal operation. The abradable layer 72 comprises a low-density metal foam, or any suitable filler material well known to those skilled in the art.

The crushable structures 64 and 66 comprise a cellular structure 74 or metal foam. The crushable structures 64 and 66 contain a viscoelastic material 76 in the pores 78 of the cellular structure 74 or metal foam, as shown more clearly in FIG. 2A. The pores 78 of the cellular structure 74 or metal foam are interconnected with the space 70 between the stiff containment casing 54, the flexible structure 62 and the crushable structures 64 and 66.

The flexible structure 62 comprises a cellular structure 80 or metal foam. The cellular structure 80 comprises honeycomb.

Squeeze film lands 82 and 84 are arranged in the space 70 between the stiff containment casing 54 and the flexible structure 62. The squeeze film lands 82 and 84 are arranged axially adjacent to the crushable structures 64 and 66. The squeeze film lands 82 and 84 are arranged radially adjacent to the stiff containment casing 54 and spaced radially from the flexible structure 62. The squeeze film lands 82 and 84 comprise a crushable material 86. The crushable material 86 comprises a cellular structure or metal foam.

Figure 2B:
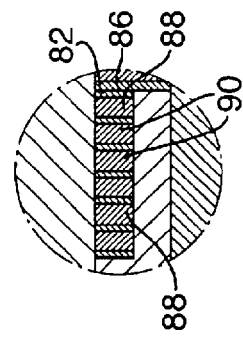
FIG. 2B is an enlargement of a squeeze film land shown in FIG. 2.
Figure 2A:
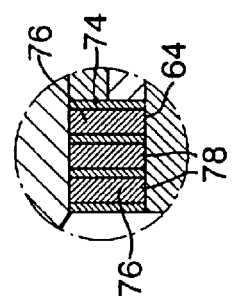
FIG. 2A is an enlargement of a crushable structure shown in FIG. 2.

The crushable material 86 comprises a viscoelastic material 90 in the pores 88 of the cellular structure or metal foam, as shown more clearly in FIG. 2B. The pores of the cellular structure or metal foam are interconnected with the space 70 between the stiff containment casing 54, the flexible structure 62 and the crushable structures 64 and 66.

The viscoelastic material may comprise solid particles, hollow particles or a high viscosity liquid. The hollow particles may be crushable to allow the viscoelastic material to be crushed.

In operation of the turbofan gas turbine engine 10, in the event that a fan blade 34 or radially outer portion of a fan blade 34 becomes detached it encounters the main containment portion 54 of the fan blade containment assembly 38. The fan blade 34, or radially outer portion of the fan blade 34, firstly encounters the flexible structure 62. The impact of the fan blade 34 produces flexural vibrations in the flexible structure 62 and causes the space 70 between the flexible structure 62 and the stiff containment casing 54 to be reduced locally by crushing of the crushable structures 64 and 66 locally to the point of impact of the fan blade 34. The localised reduction of the space 70 between the flexible structure 62 and the stiff containment casing 54 firstly provides a closing effect for a squeeze film between the squeeze film lands 82 and 84 and the flexible structure 62 and secondly provides an additional pressure to the viscoelastic material 68, which acts as a fluid under the shock loading of the fan blade 34 impact. At the point of impact of the fan blade 34 the viscoelastic material 68 becomes stiffer, in response to the increase in pressure on the viscoelastic material 68 by the crushing of the crushable structures 64 and 66 which reduces the space 70 between the flexible structure 62 and the stiff containment casing 54, and produces a squeeze film effect between the squeeze film lands 82 and 84 and the flexible structure 62. The viscoelastic material 68 damps the flexural vibrations of the flexible structure 62 at positions away from the point of impact of the fan blade 34, which would expand and contract the space 70 between the flexible structure 62 and the stiff containment casing 54. The relative movement of the particles in the viscoelastic material 68 also contributes to the damping effect by the impacts between particles damping vibrations and noise.

Additionally the viscoelastic material 76 in the pores 78 of the crushable structures 64 and 66 is squeezed out of the crushable structures 64 and 66 into the space 70 to further increase the pressure in the viscoelastic material 68. Also the viscoelastic material in the pores of the squeeze film lands 82 and 84 is squeezed out of the squeeze film lands 82 and 84 into the space 70 to further increase the pressure in the viscoelastic material 68. The movement of the viscoelastic material out of the pores of the crushable structures 64 and 66 and the squeeze film lands 82 and 84 provides additional damping.

The present invention provides a reduction in weight of the fan blade containment assembly because the viscoelastic material 68 provides local stiffening of the fan blade containment assembly in the region of a fan blade 34 impact and provides energy dissipation by viscoelastic damping of the flexing of the flexible structure 62, impact damping by impacts between particles in the viscoelastic material 68 and plastic deformation in the crushing of the crushable structures 64 and 66.

In a further embodiment, similar to that shown in FIG. 2, the squeeze film lands 82 and 84 are solid or are crushable and do not contain a viscoelastic material. The crushable structures 64 and 66 do not contain a viscoelastic material.

The flexible structure 62 may be used for passive noise reduction if the flexible structure comprises for example a honeycomb.

Alternatively the stiff containment casing comprises a cellular structure, a honeycomb structure, to stiffen the casing.

The viscoelastic material may be any suitable material that has viscoelastic properties at the impact conditions. The viscoelastic material is capable of crushing at the point of impact and is capable of damping of vibrations away from the point of impact. The viscoelastic material may comprise grease, a thixotropic paste, a polymer resin, an elastomeric material, for example rubber or synthetic rubber, or a granular material.

Preferably the stiff containment casing comprises a steel alloy, aluminium, an aluminium alloy, magnesium, a magnesium alloy, titanium, a titanium alloy, nickel, a nickel alloy, a composite, a metal matrix composite, a metal/ceramic mix or other suitable materials.

The stiff containment casing may be a fan containment casing, a compressor containment casing or a turbine containment casing.

Although the present invention has been described with reference to squeeze film lands between the stiff containment casing and the flexible structure it may be possible to dispense with them and to adjust the distance of the space between the stiff containment casing and the flexible structure to achieve a similar effect.

The flexible structure 62 may also be crushable locally to the point of impact of the fan blade 34 if the flexible structure 62 comprises a cellular structure. In that instance the flexible structure 62 is flexible up to a predetermined load and is crushable above the predetermined load.

We claim:

1. A gas turbine engine rotor blade containment assembly comprises a generally cylindrical, or frustoconical, stiff rotor blade containment casing, a generally cylindrical, or frustoconical, flexible structure arranged within and spaced radially from the stiff containment casing by crushable structures at axially spaced positions on the flexible structure, a viscoelastic material arranged to at least partially fill the space between the stiff containment casing, the flexible structure and the crushable structures.

2. A gas turbine engine rotor blade containment assembly as claimed in claim 1 wherein the viscoelastic material is arranged to fill the space between the stiff containment casing, the flexible structure and the crushable structures.

3. A gas turbine engine rotor blade containment assembly as claimed in claim 1 wherein the stiff containment casing comprises circumferentially extending ribs extending radially outwardly from the casing to stiffen the casing.

4. A gas turbine engine rotor blade containment assembly as claimed in claim 1 wherein the stiff containment casing comprises a cellular structure to stiffen the casing.

5. A gas turbine engine rotor blade containment assembly as claimed in claim 4 wherein the cellular structure comprises honeycomb.

6. A gas turbine engine rotor blade containment assembly as claimed in claim 1 wherein the crushable structures comprise a cellular structure or metal foam.

7. A gas turbine engine rotor blade containment assembly as claimed in claim 6 wherein the crushable structures contain a viscoelastic material in the pores of the cellular structure or metal foam.

8. A gas turbine engine rotor blade containment assembly as claimed in claim 7 wherein the viscoelastic material contains particles.

9. A gas turbine engine rotor blade containment assembly as claimed in claim 1 wherein the flexible structure comprises a cellular structure or metal foam.

10. A gas turbine engine rotor blade containment assembly as claimed in claim 1 wherein squeeze film lands are arranged in the space between the stiff casing and the flexible structure.

11. A gas turbine engine rotor blade containment assembly as claimed in claim 10 wherein the squeeze film lands are arranged axially adjacent to the crushable structures.

12. A gas turbine engine rotor blade containment structure as claimed in claim 10 wherein the squeeze film lands are arranged adjacent to the stiff containment casing and spaced radially from the flexible structure.

13. A gas turbine engine rotor blade containment assembly as claimed in claim 10 wherein the squeeze film lands comprise a crushable material.

14. A gas turbine engine rotor blade containment assembly as claimed in claim 13 wherein the crushable material comprises a cellular structure or metal foam.

15. A gas turbine engine rotor blade containment assembly as claimed in claim 14 wherein the crushable material comprises a viscoelastic material in the pores of the cellular structure or metal foam.

16. A gas turbine engine rotor blade containment assembly as claimed in claim 15 wherein the pores of the cellular structure or metal foam are interconnected with the space between the stiff containment casing, the flexible structure and the crushable structures.

17. A gas turbine engine rotor blade containment assembly as claimed in claim 1 wherein the viscoelastic material comprises particles.

18. A gas turbine engine rotor blade containment assembly as claimed in claim 1 wherein an abradable layer is arranged on the radially inner surface of the flexible structure.

19. A gas turbine engine rotor blade containment assembly as claimed in claim 1 wherein the stiff containment casing comprises a steel alloy, aluminium, an aluminium alloy, magnesium, a magnesium alloy, titanium, a titanium alloy, nickel, a nickel alloy, a composite, a metal matrix composite or a metal/ceramic mix.

20. A gas turbine engine rotor blade containment assembly as claimed in claim 1 wherein the stiff containment casing is a fan containment casing, a compressor containment casing or a turbine containment casing.

21. A gas turbine engine rotor blade containment assembly as claimed in claim 1 wherein the viscoelastic material comprises grease, a thixotropic paste, a polymer resin or a granular material.

* * * * *